United States Patent [19]
Dolan et al.

[11] Patent Number: 6,080,226
[45] Date of Patent: Jun. 27, 2000

[54] NITROUS OXIDE PURIFICATION BY PRESSURE SWING ADSORPTION

[75] Inventors: William B. Dolan, King of Prussia, Pa.; Andrew S. Zarchy, Kildeer, Ill.; Kirit M. Patel, Winfield, Ill.; Timothy M. Cowan, St. Charles, Ill.; Mark M. Davis, Chicago, Ill.

[73] Assignee: UOP LLC, Des Plaines, Ill.

[21] Appl. No.: 09/163,982

[22] Filed: Sep. 30, 1998

Related U.S. Application Data

[60] Provisional application No. 60/065,468, Nov. 19, 1997.

[51] Int. Cl.$^7$ .................................................. B01D 53/047
[52] U.S. Cl. ............................... 95/100; 95/103; 95/105; 95/129; 95/143
[58] Field of Search ........................ 95/96–98, 100–105, 95/128, 129, 143, 148

[56] References Cited

U.S. PATENT DOCUMENTS

| | | | |
|---|---|---|---|
| 2,794,056 | 5/1957 | Winstrom | 260/631 |
| 3,176,444 | 4/1965 | Kiyonaga | 55/26 |
| 3,430,418 | 3/1969 | Wagner | 55/25 |
| 3,564,816 | 2/1971 | Batta | 55/26 |
| 3,636,100 | 1/1972 | Mueller et al. | 260/537 P |
| 3,654,355 | 4/1972 | Mueller et al. | 260/533 C |
| 3,703,068 | 11/1972 | Wagner | 55/21 |
| 3,738,087 | 6/1973 | McCombs | 55/58 |
| 3,986,849 | 10/1976 | Fuderer et al. | 55/25 |
| 4,070,164 | 1/1978 | Miwa et al. | 95/101 |
| 4,077,780 | 3/1978 | Doshi | 95/100 |
| 4,450,291 | 5/1984 | Chi et al. | 562/530 |
| 4,507,271 | 3/1985 | Van Deyck et al. | 95/129 X |
| 4,775,396 | 10/1988 | Rastelli et al. | 55/58 |
| 4,834,780 | 5/1989 | Benkmann | 95/98 |
| 4,853,004 | 8/1989 | Kaplan et al. | 55/25 |
| 5,015,272 | 5/1991 | Okada et al. | 95/100 X |
| 5,084,075 | 1/1992 | Sircar | 95/103 X |
| 5,110,995 | 5/1992 | Kharitonov et al. | 568/800 |
| 5,203,888 | 4/1993 | Maurer | 95/128 X |
| 5,258,056 | 11/1993 | Shirley et al. | 95/22 |
| 5,612,009 | 3/1997 | Fetzer et al. | 423/239.1 |
| 5,656,067 | 8/1997 | Watson et al. | 95/101 |
| 5,919,286 | 7/1999 | Golden et al. | 95/129 X |
| 5,928,411 | 7/1999 | Falb et al. | 95/129 |

FOREIGN PATENT DOCUMENTS

| | | | |
|---|---|---|---|
| 1357053 | 12/1987 | U.S.S.R. | 95/129 |
| 95/27691 | 10/1995 | WIPO . | |

OTHER PUBLICATIONS

Abatement of Nitrous Oxide Emissions Produced in Adipic Acid Industry, R.A. Reimer, C.S. Slaten, M Sepan, M.W. Lower and P.E. Tomlinson, published in AIChE's *Environmental Progress*, vol. 13, No. 2., May 1994, pp. 134–137.

*Ullman's Encyclopedia of Industrial Chemistry*, 5$^{th}$ Edition, vol. A1, edited by Wolfgang Gerhartz et al, (1997) pp. 269–272.

*Encyclopedia of Chemical Processing and Design*, editied by John J. McKetta, published by Marcel Dekkar, Inc., (19), vol. 2, pp. 128–142.

*Chemical Market Reporter*, vol. 251, No. 1, Jan. 6, 1997.

Primary Examiner—Robert H. Spitzer
Attorney, Agent, or Firm—John G. Tolomei; Richard P. Silverman

[57] ABSTRACT

A feedstream comprising nitrous oxide is purified by a pressure swing adsorption process employing a copurge with an oxygen-lean stream to produce a high purity nitrous oxide stream. The high purity nitrous oxide stream can be incorporated in a complex for the production of adipic acid to recover nitrous oxide from a dilute waste stream and pass the recovered nitrous oxide to a process for the production of phenol from an aromatic hydrocarbon. Unreacted nitrous oxide from the phenol production step acid can be recovered in a second, or vent PSA step, and combined with the recovery of byproduct nitrous oxide waste streams from the production of adipic for the overall recovery of nitrous oxide, thereby significantly reducing nitrous oxide emissions from the production of adipic acid.

30 Claims, 9 Drawing Sheets

Fig. 4 Nitrous Oxide PSA Cycle

| Bed | | | | | | | | | | | |
|---|---|---|---|---|---|---|---|---|---|---|---|
| 1 | Adsorption | | | VENT | EQ | Blowdown | P | Purge | EQ | Repressurize | |
| 2 | | | | Adsorption | | Vent | EQ | Blowdown | P | Purge | EQ |
| 3 | Purge | EQ | Repressurize | | | Adsorption | | Vent | EQ | Blowdown | P |
| 4 | Blowdown | P | Purge | EQ | Repressurize | | | Adsorption | | VENT | EQ |
| 5 | VENT | EQ | Blowdown | P | Purge | EQ | Repressurize | | | Adsorption | |

N2O on CaY

O2 on CaY

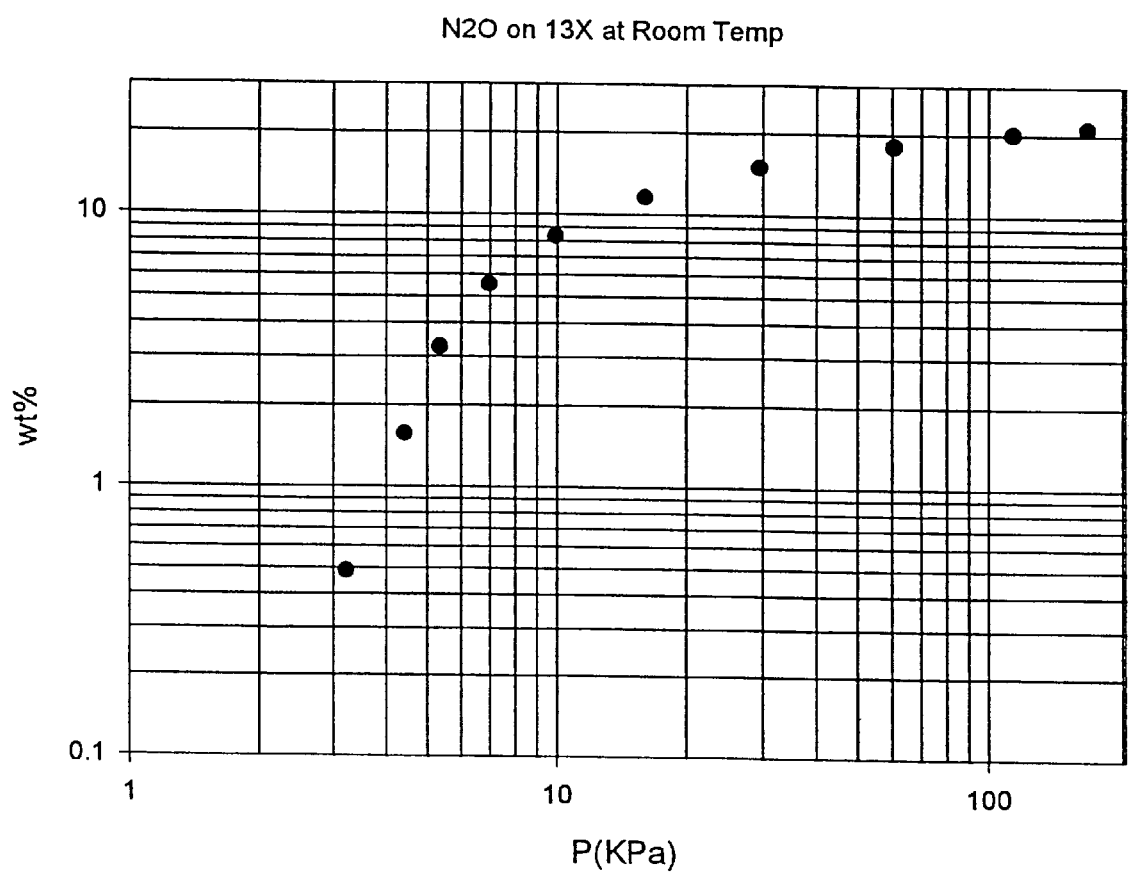

NITROUS OXIDE PURIFICATION BY PRESSURE SWING ADSORPTION

CROSS-REFERENCE TO RELATED APPLICATIONS

This application claims priority from copending Provisional Application No. 60/065,468, filed Nov. 19, 1997, and is hereby incorporated by reference.

FIELD OF THE INVENTION

The present invention relates to processes for the separation of nitrous oxide from feedstreams containing mixtures thereof with oxygen and nitrogen. More particularly, the present invention relates to the use of a particular combination of pressure swing adsorption and a nitrous oxide selective adsorbent to recover a high purity nitrous oxide stream.

BACKGROUND OF THE INVENTION

Nitrous oxide is a chemically active trace gas which is believed to contribute to the recent increase in the Earth's surface temperature by absorbing reflected infrared radiation. According to scientific studies the global warming potential of each molecule of nitrous oxide emitted is about 290 times that of the carbon dioxide molecule. Furthermore, the atmospheric lifetime of nitrous oxide molecules in the environment is estimated to be approximately 150 years. Although the impact of man-made nitrous oxide is less well-defined, it is known that increases in nitrous oxide in the atmosphere will eventually result in increased ozone destruction. Adipic acid is an important synthetic chemical used in the manufacture of a nylon polymer, nylon 6,6 polyamide, which has been identified as a source of man-made nitrous oxide in the atmosphere. This nylon polymer is used throughout the world in carpets, tire cord, apparel, upholstery, auto parts, and in many other products which impact our life every day. Typically, adipic acid is produced from cyclohexane wherein the cyclohexane is converted to mixtures of the alcohol and ketone: cyclohexanol and cyclohexanone. The alcohol and ketone mixture is subsequently oxidized with nitric acid to produce adipic acid. The nitric acid oxidation of the cyclohexanol mixture results in the production of approximately one mole of nitrous oxide per mole of adipic acid produced. Some nitrous oxide which is contained in the reaction off-gases is emitted to the atmosphere. Estimates provided in an article entitled, *Abatement of Nitrous Oxide Emissions Produced in the Adipic Acid Industry*, by R. A. Reimer, C. S. Slaten, M. Seapan, M. W. Lower and P. E. Tomlinson, published in AIChE's *Environmental Progress*, Vol. 13, No. 2, May 1994, pp. 134–137, suggest that in 1990 about 68 percent of the nitrous oxide produced as a dilute waste gas stream from the manufacturing of adipic acid was ultimately emitted to the atmosphere. The basic technology for producing adipic acid by the nitric acid oxidation of cyclohexanol, cyclohexanone, or a mixture thereof is well-known and is described in *Ullman's Encyclopedia of Industrial Chemistry*, 5$^{th}$/Edition, Volume A1, edited by Wolfgang Gerhartz et al., (1997), pages 269–272, and in the *Encyclopedia of Chemical Processing and Design*, edited by John J. McKetta, published by Marcel Dekker, Inc., (19), Vol. 2, pages 128–142, herein incorporated by reference. Cyclohexane may be produced from phenol conventionally by mild hydrogenation. U.S. Pat. No. 5,110,995 discloses a process for the preparation of phenol or phenol derivatives by the oxidation of aromatic hydrocarbons such as benzene with nitrous oxide at a temperature between about 275° C. and about 450° C. in the presence of a zeolite catalyst. In one proposed scheme, the nitrous oxide waste stream from the adipic acid plant will be employed as the feed to the benzene-to-phenol (Chemical Marketing Reporter, Vol. 251, No. 1, Jan. 6, 1997).

Pressure swing adsorption (PSA) provides an efficient and economical means for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product, which is separated from the less strongly adsorbable gas. For example, it may be desired to remove carbon monoxide and light hydrocarbons from a hydrogen-containing feed stream to produce a purified (99+%) hydrogen stream for a hydrocracking or other catalytic process where these impurities could adversely affect the catalyst or the reaction. On the other hand, it may be desired to recover more strongly adsorbable gases, such as ethylene, from a feedstream to produce an ethylene-rich product.

In pressure swing adsorption, a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more cocurrent depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure on the adsorption zone is further reduced by withdrawing desorbed gas countercurrently to the direction of feedstream. Finally, the adsorption zone is purged and repressurized. The final stage of repressurization is typically with product gas and is often referred to as product repressurization. In multi-zone systems there are typically additional steps, and those noted above may be done in stages. U.S. Pat. Nos. 3,176,444 issued to Kiyonaga, 3,986,849 issued to Fuderer et al., and 3,430,418 and 3,703,068 both issued to Wagner, among others, describe multi-zone, adiabatic pressure swing adsorption systems employing both cocurrent and countercurrent depressurization, and the disclosures of these patents are incorporated by reference in their entireties. The above-mentioned patents to Fuderer et al., and Wagner are herein incorporated by reference.

Various classes of adsorbents are known to be suitable for use in PSA systems, the selection of which is dependent upon the feedstream components and other factors generally known to those skilled in the art. In general, suitable adsorbents include molecular sieves, silica gel, activated carbon, and activated alumina. For some separations, specialized adsorbents can be advantageous. One example of such a specialized adsorbent is disclosed in U.S. Pat. No. 4,775,396. U.S. Pat. No. 4,775,396 issued to Rastelli et al. discloses a PSA process for the bulk separation of $CO_2$ from methane, e.g., landfill gas. The patent discloses that for a landfill gas purification process, $CO_2$ can be effectively removed from gas mixtures containing $CO_2$ using the calcium ion-exchanged form of zeolite A, but because of the strong affinity between the sorbent and adsorbate, thermal energy is required for effective desorption of the $CO_2$. This would suggest a thermal swing adsorption process. However, for the bulk removal of $CO_2$ from methane, the patent discloses that PSA can be effective when using faujasite type of zeolitic aluminosilicate containing at least 20 equivalent percent of at least one cation species selected from the group consisting of zinc, rare earth, hydrogen and ammonium and containing not more than 80 equivalent percent of alkali metal or alkaline earth metal cations.

In the past, others have attempted to control nitrous oxide emissions from adipic acid production by either recovering a pure nitrous product (99%) by cryogenic means or by the chemical or thermal destruction of the nitrous oxide. However, minor amounts of carbon oxides found in the vent streams from adipic acid manufacture can make cryogenic methods expensive, requiring the removal of the carbon oxide prior to separating the nitrous oxide. Processes employing thermal destruction or catalytic decomposition of the nitrous oxide are expensive and do not result in any other benefit to the production of adipic acid. Methods are sought to substantially reduce emissions of nitrous oxide from adipic acid complexes by the recovery of the nitrous oxide.

SUMMARY OF THE INVENTION

By the present invention, a pressure swing adsorption (PSA) process is provided for nitrous oxide purification that can yield a high purity nitrous oxide product. The process employs the use of a zeolitic molecular sieve that can selectively adsorb nitrous oxide in the presence of oxygen to provide a nitrous oxide product essentially free of oxygen. Nitrous oxide separated in this manner can be subsequently used in selective oxidation processes to increase the production of adipic acid from benzene, thereby providing a novel solution to the problem of nitrous oxide emissions from adipic acid manufacturing and increasing the overall production of adipic acid. The present invention is particularly useful in a complex for the production of adipic acid which produces a dilute waste stream comprising nitrous oxide, an unwanted by product of the nitric acid oxidation of cyclohexanone and cyclohexanol mixtures. The process of the present invention is especially useful in adipic acid complexes which also include a process for the conversion of benzene to phenol by the nitrous oxide oxidation of benzene, wherein the emission of nitrous oxide to the atmosphere from the complex can essentially be eliminated.

In a broad aspect of the present invention there is provided a pressure swing adsorption process for the separation of nitrous oxide from a waste stream comprising nitrous oxide, nitrogen, and oxygen. The process comprises a series of steps. The waste stream at effective conditions including an adsorption pressure and an adsorption temperature is passed to a first adsorbent bed of at least two adsorbent beds in a pressure swing adsorption zone to provide a first adsorption effluent stream comprising oxygen and nitrogen. Each of the adsorbent beds contains an adsorbent selective for the adsorption of nitrous oxide relative to nitrogen and oxygen. The passing of the waste stream to the first adsorbent bed is terminated prior to the breakthrough of nitrous oxide from the first adsorbent bed. The first adsorbent bed is cocurrently depressurized to a first reduced pressure that is lower than the adsorption pressure and to provide a first vent stream comprising oxygen and nitrogen. The first adsorbent bed is further cocurrently depressurized to an equalization pressure that is lower than the first reduced pressure, and an equalization effluent is passed to a second adsorbent bed being repressurized. The first adsorbent bed is countercurrently depressurized to a desorption pressure that is lower than the equalization pressure and effective to desorb nitrous oxide, and a first desorption effluent stream comprising nitrous oxide is withdrawn. The first adsorbent bed is countercurrently purged with an oxygen-lean stream to provide a second desorption effluent stream comprising nitrous oxide. The first desorption effluent stream and the second desorption effluent stream are combined to provide a nitrous oxide stream, and the first adsorbent bed is repressurized to the adsorption pressure. The above steps are repeated to provide a continuous process.

In another embodiment of the present invention there is provided a process for the separation of nitrous oxide from a waste stream comprising nitrous oxide, nitrogen, and oxygen. The process comprises a first PSA zone and a second PSA zone connected in series. The first and second PSA zones contain a plurality of adsorbent beds. Each of the adsorbent beds contains an adsorbent selective for the adsorption of nitrous oxide. The first PSA zone and the second PSA zone are each operated at effective conditions to adsorb nitrous oxide in the presence of nitrogen and oxygen. The waste stream is passed to the first PSA zone to provide a first effluent stream comprising oxygen and nitrogen at a first elevated pressure. Upon desorption, an intermediate product stream is withdrawn from the first PSA zone at a first desorption pressure. The intermediate product stream is compressed to a second elevated pressure to provide a compressed intermediate product stream, and the compressed intermediate product stream is passed to a second PSA zone to provide a second effluent stream comprising oxygen and nitrogen. Upon desorption a high purity nitrous oxide stream comprising at least 90 mol-% nitrous oxide is provided from the second PSA zone at a second desorption pressure.

In a further embodiment, the invention is a pressure swing adsorption process for the separation of nitrous oxide from a waste stream comprising nitrous oxide, nitrogen, and oxygen. The process comprises a series of steps as follows. The waste stream at an adsorption pressure is passed to a first adsorbent bed of a first pressure swing adsorption zone to provide an adsorption effluent comprising oxygen and nitrogen. The first pressure swing adsorption zone comprises a plurality of adsorbent beds. Each adsorbent bed contains a nitrous oxide selective adsorbent. The nitrous oxide selective adsorbent is selected from the group consisting of silica gel, calcium Y zeolite, zinc X zeolite, and mixtures thereof. The adsorbent bed is cocurrently purged at a purge pressure equal to or lower than the adsorption pressure with an oxygen-lean stream to provide an additional adsorption effluent stream. The first adsorbent bed is cocurrently depressurized to a first reduced pressure that is lower than the adsorption pressure to provide a provide purge stream comprising oxygen and nitrogen. The first adsorbent bed is further cocurrently depressurized to an equalization pressure that is lower than the first reduced pressure and an equalization effluent is passed to a second adsorbent bed being repressurized. The first adsorbent bed is countercurrently depressurized to provide a desorption effluent stream comprising high purity nitrous oxide comprising less than about 2 mol-% oxygen. The first adsorbent bed is countercurrently purged with an oxygen-lean stream to provide an additional high purity nitrous oxide stream. The first adsorbent bed is countercurrently repressurized with a portion of the adsorption effluent; and the above steps are repeated to provide a continuous process.

BRIEF DESCRIPTION OF THE DRAWINGS

FIG. 4 is chart showing a nitrous oxide adsorption isotherm on silica gel.

FIG. 9 is a chart showing a nitrous oxide adsorption isotherm on a 13X zeolite adsorbent.

DETAILED DESCRIPTION OF THE INVENTION

Figure 1:
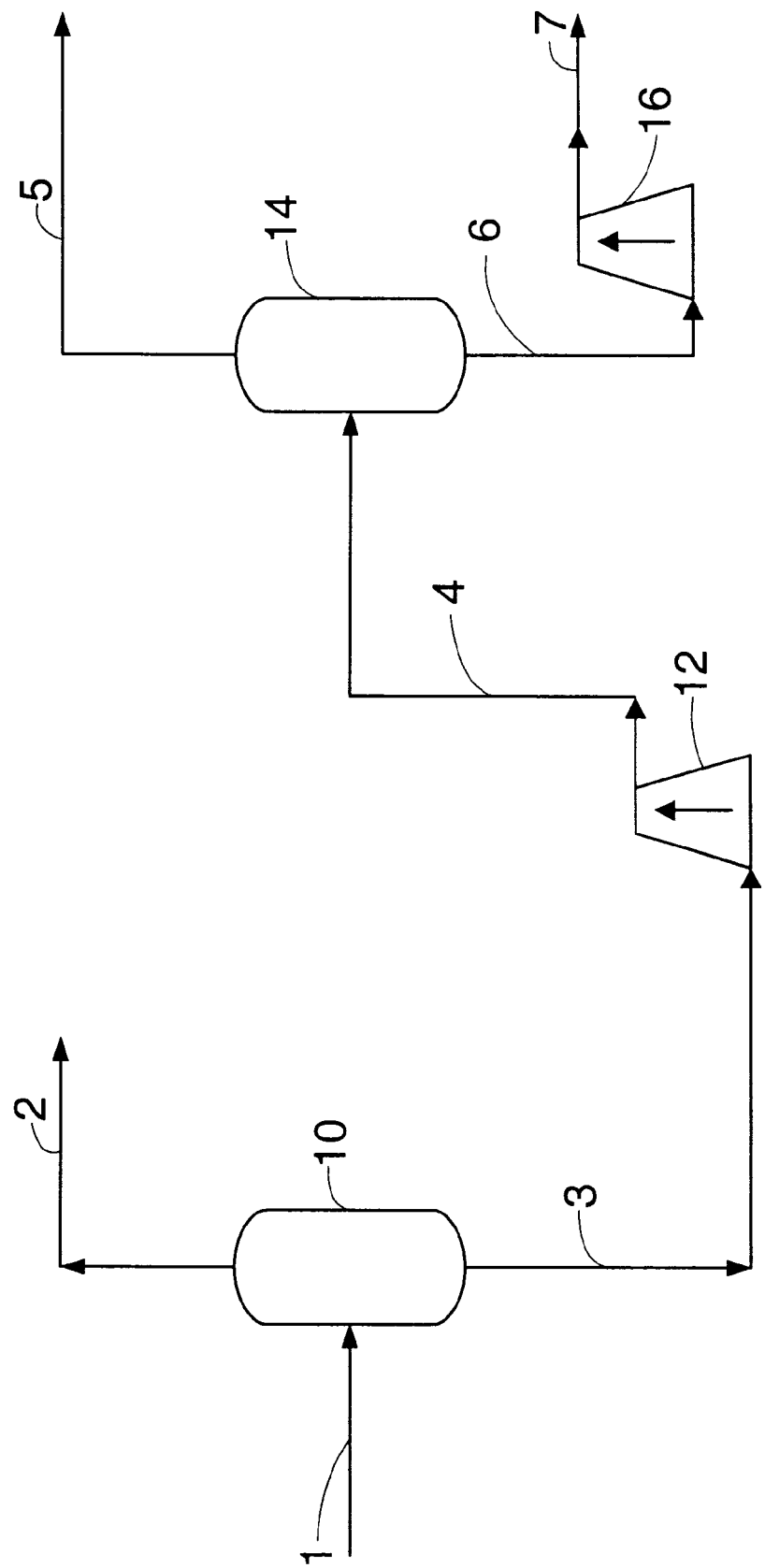
FIG. 1 is a simplified block flow diagram illustrating a two-stage pressure swing adsorption separation system.

The process of the present invention is useful for the preparation of a high purity nitrous oxide stream which is essentially free of oxygen. Preferably, the waste stream or feedstream to the process largely comprises a mixture of oxygen, nitrogen, and nitrous oxide, although minor amounts of carbon dioxide, water, and hydrocarbons can also be present. By the term "hydrocarbons," it is meant hydrocarbons having from 1 to 8 carbon atoms per molecule, including, alkanes, alkenes, cycloalkenes, and aromatic hydrocarbons such as benzene. Preferably, the nitrous oxide content of the feedstream ranges from about 10 to about 75 mol-%; the oxygen in the feedstream ranges from about 12 to about 3 mol-%, and the nitrogen in the feedstream ranges from about 80 to about 25 mol-%. More preferably, the nitrous oxide content of the feedstream ranges from about 10 to about 25 mol-%. The feedstream may also comprise carbon dioxide in amounts ranging from about 0.05 to about 1 mol-%.

The PSA process of the present invention is of the general PSA type. The waste stream, or feedstream, is introduced to an adsorbent bed undergoing adsorption at the highest pressure, or the adsorption pressure, to an inlet end of an adsorbent bed having the inlet end and a discharge end opposite. The nitrous oxide is selectively adsorbed in each of at least two sequentially operated adsorbent beds. A nitrous oxide-depleted, adsorption effluent stream is discharged from the adsorbent beds so that a nitrous oxide adsorption front is formed in the adsorbent bed at the feedstream inlet end and the adsorption front progressively moves toward the discharge end. Preferably, the nitrous oxide-depleted stream recovered as an adsorption effluent stream and contains less than about 5 mol-% nitrous oxide and, more preferably, the adsorption effluent stream contains less than 2 mol-% nitrous oxide. The feedstream flow is terminated when the nitrous oxide adsorption front is at a predetermined point between the adsorbent bed inlet and discharge ends prior to breakthrough of the nitrous oxide adsorption front. The adsorbent bed is then cocurrently depressurized to a first reduced pressure in the same direction as the feedstream flow to the adsorbent bed to provide a vent stream, or a provide purge stream, comprising oxygen and nitrogen. The vent stream may be used to purge or partially repressurize another adsorbent bed. The adsorption pressure ranges from about 170 kPa (25 psia) to about 3.5 MPa (515 psia). The cocurrent depressurization step reduces the pressure of the adsorbent bed to a first reduced pressure which is lower than the adsorption pressure and ranges from about 100 kPa (15 psia) to about 350 kPa (50 psia). The adsorbent bed is further cocurrently depressurized in at least 1 equalization step to an equalization pressure which is lower than the first reduced pressure and ranges from about 3 kPa to about 210 kPa (30 psia). Generally, this equalization is carried out by passing the equalization effluent to another, or second, adsorbent bed undergoing repressurization. The adsorption zone is countercurrently (in a direction opposite to the feedstream flow) depressurized to a desorption pressure that is lower than the equalization pressure and effective to desorb nitrous oxide from the nitrous oxide selective adsorbent and a first desorption effluent stream comprising nitrous oxide is withdrawn. The desorption pressure ranges between about 3 kPa (0.5 psia) and about 210 kPa (30 psia). More preferably, the desorption pressure ranges between about 3 kPa (0.5 psia) and about 100 kPa (15 psia). The adsorbent bed is countercurrently purged with an oxygen-lean stream such as a pure nitrogen stream (>98 mol-% nitrogen) or other inert gas stream comprising less than about 2 mol-% oxygen to provide a second desorption effluent stream comprising nitrous oxide. The first and second desorption effluent streams are combined to provide a nitrous oxide stream. Preferably, the nitrous oxide stream comprises less than about 2 mol-% oxygen, and more preferably, the nitrous oxide stream comprises less than about 1 mol- % oxygen, and most preferably, the nitrous oxide stream comprises less than about 0.1 mol-% oxygen. The depressurized adsorbent bed may be countercurrently purged of the nitrous oxide by flowing one part of the oxygen-depleted as from another adsorption zone countercurrently therethrough from the discharge end to the inlet end. The countercurrently purged zone is at least partially repressurized by another adsorption zone prior to the introduction of the wastestream to the inlet end. The term "cocurrent" denotes that the direction of gas flow is cocurrent to the direction of gas flow during the adsorption step. Similarly, the term "countercurrent" denotes that the gas flow is countercurrent to the direction of gas flow during the adsorption step.

The adsorbent selective for the adsorption of nitrous oxide is preferably selected from the group consisting of zeolite X, zeolite Y, silica gel, and activated carbon. The faujasite type of zeolite employed in the practice of the pressure swing adsorption system can be either of the type X or the type Y. Zeolite X and the method for its preparation is described in detail in U.S. Pat. No. 2,882,244 issued Apr. 14, 1959 to R. M. Milton. The $SiO_2/Al_2O_3$ molar ratio of zeolite X is from about 2 up to 3. In the as synthesized form, zeolite Y has a $SiO_2/Al_2O_3$ molar ratio of from greater than 3 up to 6. The method for synthesizing zeolite Y is disclosed in detail in U.S. Pat. No. 3,130,007 issued Apr. 21, 1964 to D. W. Breck. The forms of zeolite Y which contain molar $SiO_2/Al_2O_3$ values greater than 6 can be prepared by several dealumination techniques well known in the art. For example, high temperature steaming treatments which result in dealumination are reported by P. K. Maher et al. in MOLECULAR SIEVE ZEOLITES, Advan. Chem. Ser. 101, American Chemical Society, Washington, D.C., 1971, p. 266. A more recently reported procedure, especially useful for increasing $SiO_2/Al_2O_3$ of zeolite Y, involves dealumination and the substitution of silicon into the dealuminated lattice sites. This process is disclosed in U.S. Pat. No. 4,503,023 issued Mar. 5, 1985 to Skeels et al. As used herein, the term "faujasite type of structure" means the framework structure, irrespective of chemical composition, distribution of the different T-atoms, cell dimensions and symmetry, designated as "FAU" in the ATLAS OF ZEOLITE STRUCTURE TYPES, W. M. Meier and D. H. Olsen, Published by the Structure Commission of the International Zeolite Association (1978).

1. In order to be useful in the process of the present invention, the faujasite zeolite must be treated in order to have a framework $SiO_2/Al_2O_3$ molar ratio of from 2 to 100 and containing at least 20 equivalent percent of one or a mixture of two or more cation species selected from the group consisting of zinc, rare earth, hydrogen, ammonium and calcium and containing not more than 80 equivalent percent of alkali or alkaline earth metal cations other than calcium or mixtures thereof. Preferably, the framework $SiO_2/Al_2O_3$ ratio of the zeolitic molecular sieve is from 2 to 20 and the zeolitic molecular sieve contains at least 20 equivalent percent of one or a mixture of two or more of zinc, rare earth, hydrogen, ammonium and calcium cations. It is further preferred that the zeolitic molecular sieve contains at least 40 equivalent percent of one or a mixture of two or more of zinc, rare earth, hydrogen, ammonium and calcium cations and less than 40 equivalent percent of alkali and alkaline earth metal cations other than calcium. When Zeolite X is employed as the adsorbent, it is preferred that zinc cations be used as an ion-exchange cation. When Zeolite Y is employed as the adsorbent, it is preferred that calcium cations be used as an ion-exchange cation. The various ion-exchange techniques and the like which can be used to prepare the faujasite zeolites of the present invention are well known to those skilled in the art and need not be further described herein. More preferably, the zeolite adsorbent of the present invention is selected from the group consisting of calcium Y, zinc X, 13X, silica gel and mixtures thereof. The adsorbent bed of the present invention may include an adsorbent mixture of nitrous oxide selective adsorbent disposed in multiple layers within the adsorbent bed. Preferably, at least about 20 percent of the adsorbent mixture comprises a layer of silica gel adsorbent.

In accordance with the present invention, the adsorption pressure is generally from about 350 kPa to about 7 MPa (50 to 1000 psia) and preferably from about 350 kPa to about 3.5 MPa (100 to 515 psia). The desorption pressure is preferably from 3 to 350 kPa (about 0.5 to 50 psia) and more preferably the desorption pressure ranges from about 3 kPa to about 210 kPa (0.5 to 30 psia). Suitable operating temperatures are generally within the range of from about 10 to about 65° C. (50–150° F.). There can be a variety of cocurrent depressurization steps to intermediate pressures, cocurrent purging steps and countercurrent purging steps, all of which are well known to those skilled in the art and described in the previously cited patents relating to PSA processes. For example, one to 5 or more of such cocurrent depressurization steps can be employed for pressure equalization to further improve product recovery such as disclosed in the above-identified U.S. Pat. No. 3,986,849. In addition, the countercurrent purge step can be performed either prior to, simultaneously with, or subsequently to the regenerating or desorption step by passing an oxygen-lean stream countercurrently through the adsorption zone and recovering a countercurrent purge effluent stream comprising nitrous oxide. The oxygen-lean stream can comprise a portion of the adsorption effluent product stream. Other details of the pressure swing adsorption process are described in Fuderer et al., U.S. Pat. No. 3,986,849, the four adsorption zone systems described in Wagner, U.S. Pat. No. 3,430,418 and Batta, U.S. Pat. No. 3,564,816, the three adsorption zone systems described in Batta, U.S. Pat. No. 3,636,679, and the two adsorption zone systems described in McCombs, U.S. Pat. No. 3,738,087, the disclosures of which are hereby incorporated by reference.

The process of the present invention can also include a vent PSA step to recover nitrous oxide from the effluent of the phenol preparation step and the return of a portion of the high purity nitrous oxide from the PSA zone to the phenol chemical reaction zone reactor. If the phenol is further converted in a second reaction zone by catalytic hydrogenation to a mixture of cyclohexanol (A) and cyclohexanone (K), the mixture is known as a KA stream. The KA stream is subsequently oxidized conventionally with nitric acid as disclosed in U.S. Pat. No. 5,612,009 (See column 2, lines 5–10), to produce adipic acid and a vent stream comprising nitrous oxide. The present invention integrated a PSA process to recover nitrous oxide from the vent gases of the adipic acid reaction zone to provide additional nitrous oxide to feed to the phenol production step. In conventional adipic acid production, the nitrous oxide produced in a waste gas stream represents a loss of nitric acid and is generally released to the atmosphere or the nitrous oxide is thermally or catalytically destroyed.

The above PSA system is integrated with a process for the production of phenol from aromatic hydrocarbons as described in U.S. Pat. No. 5,110,995, which is hereby incorporated by reference. U.S. Pat. No. 5,110,995 discloses a process for the preparation of phenol or phenol derivatives by the oxidation of aromatic hydrocarbons such as benzene with nitrous oxide at a temperature between about 275° C. and about 450° C. in the presence of a zeolite catalyst. The zeolite catalyst has a structure analogous to ZSM-5, ZSM-11, ZSM-12, mordenite, zeolite Beta and EU. The phenol can be further processed in the conventional manner to produce cyclohexanone and/or adipic acid.

The process of the present invention will hereinafter be described with reference to the figures.

FIG. 1 is a schematic flowsheet of a two-stage pressure swing adsorption PSA process for the recovery of nitrous oxide from a wastestream comprising nitrogen and oxygen and comprising more than about 10 mol-% nitrous oxide. The feedstream in line 1 is passed to a first PSA zone 10 containing a nitrous oxide selective adsorbent at an adsorption pressure effective to produce a first adsorption effluent in line 2 comprising oxygen and nitrogen and a first desorption effluent in line 3, withdrawn at a first desorption pressure and comprising nitrous oxide. Preferably, the first desorption effluent comprises more than about 50 mol-% nitrous oxide, and more preferably the first desorption effluent comprises more than about 80 mol-% nitrous oxide, and most preferably, the first desorption effluent comprises more than about 85 mol-% nitrous oxide. The first adsorption effluent in line 2, now depleted is nitrous oxide to less than about 5 mol-% nitrous oxide, and more preferably the first adsorption effluent depleted to less than about 2 mol-% nitrous oxide, and most preferably the first adsorption effluent depleted to less than 1 mol-% nitrous oxide is passed to a compressor 12 to provide a compressed gas stream in line 4. The compressed gas stream is passed to a second PSA zone at a second adsorption pressure ranging between about 170 kPa (25 psia) and about 3.5 MPa (515 psia). The second PSA zone comprises at least two beds containing a second adsorbent selective for the adsorption of nitrous oxide to provide a second adsorption effluent stream in line 5 and a second desorption effluent in line 6 at a second desorption pressure. The second adsorption effluent in line 5 may be released to the atmosphere and the second desorption effluent in line 6 is compressed in second compressor 16 to provide a compressed nitrous oxide stream in line 7 at a product pressure. Preferably, the second desorption pressure ranges from about 3 kPa (0.5 psia) to about 210 kPa (30 psia). Preferably, the product pressure ranges from about 170 kPa (25 psia) to about 3.5 MPa (515 psia). The compressed nitrous oxide stream is withdrawn for use in other chemical production processes such as oxidation processes, or is further purified for medical and food processing applications.

Figure 2:
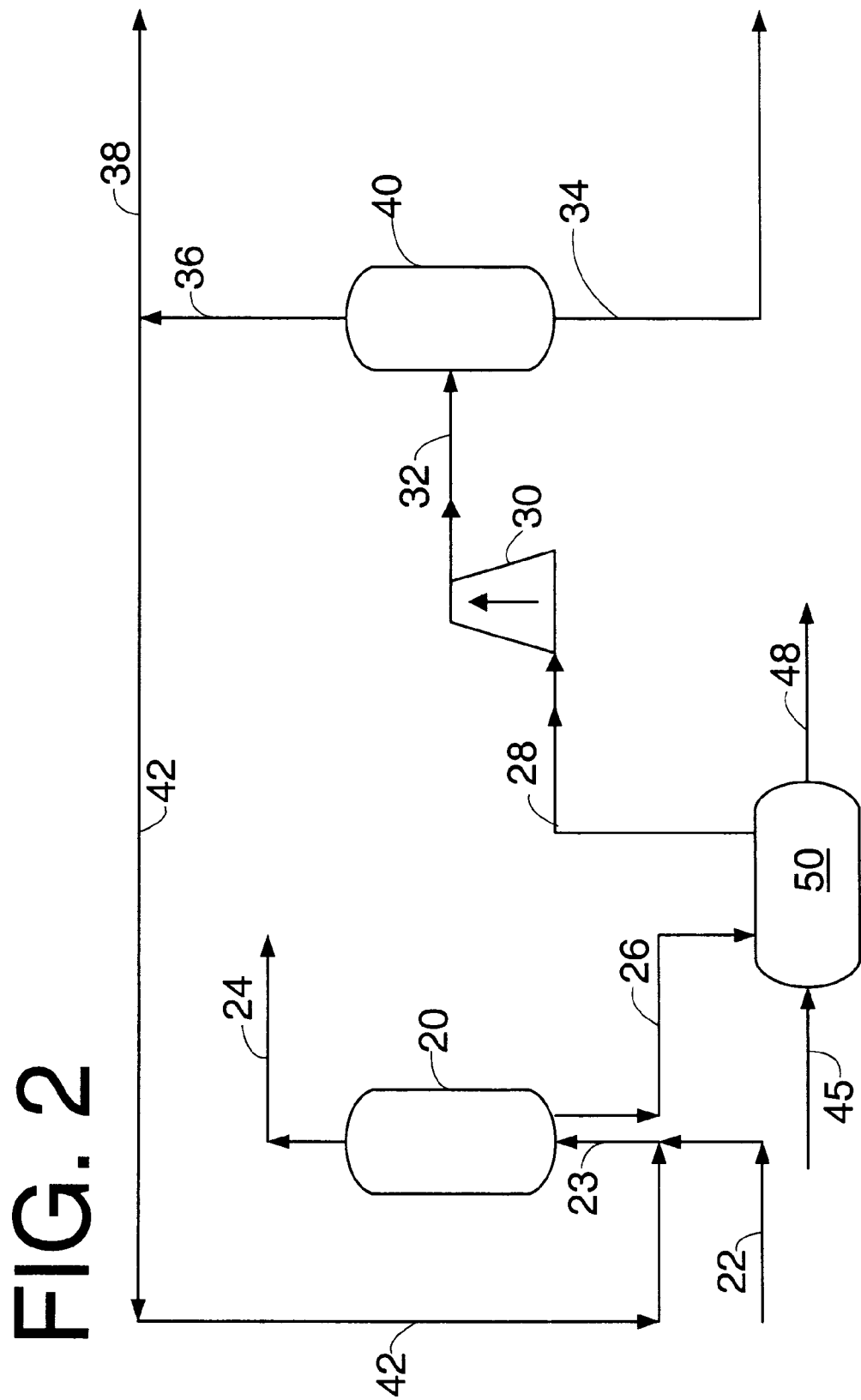
FIG. 2 is a simplified block flow diagram illustrating the integration of a nitrous PSA recovery system and a process for phenol production from benzene.

FIG. 2 is a schematic flowsheet for the integration of a PSA process for the recovery of nitrous oxide with a process for the production of phenol from benzene by oxidation with nitrous oxide. According to FIG. 2, a feedstream in line 22 comprising oxygen, nitrogen, carbon dioxide, and nitrous oxide is passed via lines 22 and 23 to a first PSA zone 20 at a first adsorption pressure. The first PSA zone comprises at last two separate vessels containing a nitrous oxide selective oxide.

The nitrous oxide selective adsorbent is selected from the group consisting of molecular sieves, activated carbon, silica gel and mixtures thereof. Preferably, the molecular sieves comprise faujasite or alkali, alkaline earth, and rare earth exchanged forms of faujasite. Each adsorbent bed contains a first end and a second end opposite for the introduction or withdrawal of gas streams. The adsorbent beds are equipped with valves and operated in a conventional manner such that at least one of the vessels is undergoing adsorption while another vessel is undergoing desorption. During adsorption the feedstream is passed to the first PSA zone and a first adsorption effluent is withdrawn in line 24. During desorption, a desorption effluent stream or high purity nitrous oxide stream comprising at least 50% nitrous oxide and less than about 2 mol-% oxygen is withdrawn in line 26. The first desorption effluent stream in line 26 is passed to a chemical reaction zone, or a phenol production zone 50 wherein the first desorption effluent stream 26 and an aromatic hydrocarbon stream comprising benzene in line 45 are reacted at effective conditions in the presence of a catalyst to partially oxidize and convert aromatic hydrocarbon to produce a first product stream comprising phenol which is withdrawn in line 48 and a first reactor vent stream in line 28 comprising unreacted nitrous oxide. The first reactor vent stream in line 28 is passed to a compressor 30 to raise the pressure of the first reactor vent stream to a second adsorption pressure and to provide a compressed reactor vent stream in line 32 comprising benzene, nitrogen and carbon dioxide. The compressed reactor vent stream in line 32 is passed to a second PSA zone 40 for recovery of benzene. The second PSA zone 40 contains at least 2 adsorbent beds, each adsorbent bed containing a selective adsorbent. During adsorption, a second adsorption effluent comprising nitrogen and carbon dioxide is withdrawn in line 36 and vented to the atmosphere via line 38. A portion of the adsorption effluent comprising less than about 2 mol-% oxygen in line 36 is passed to the first PSA zone via lines 42 and 23 as an oxygen-lean stream to copurge the adsorbent bed in the first PSA zone at the completion of an adsorption step to reduce the oxygen co-adsorbed on the adsorbent prior to desorption. The second PSA zone undergoes desorption and a second desorption effluent in line 34 comprising aromatic hydrocarbons such as benzene is withdrawn. The benzene recovered in this manner may be recombined with the benzene stream in line 45 and returned to the phenol production reactor (not shown).

Figure 3:
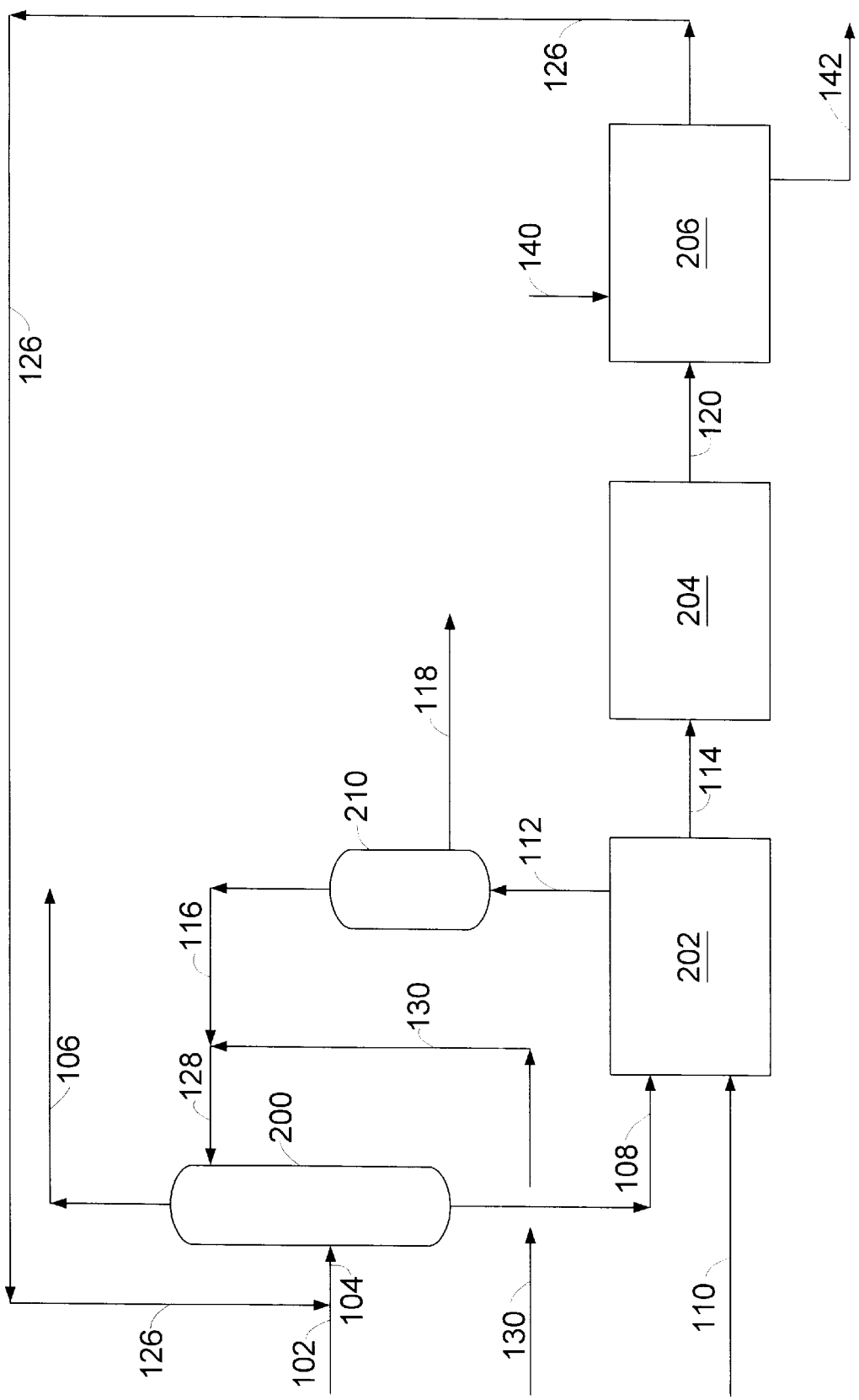
FIG. 3 is a simplified block flow diagram illustrating the integration of a nitrous PSA recovery system and a process for adipic acid production.

FIG. 3 is a schematic flowsheet of an integrated complex for the production of adipic acid incorporating a PSA zone for recovery of nitrous oxide and a chemical reaction zone for the production of phenol. A wastestream in line 102 comprising nitrous oxide, oxygen, and nitrogen is passed via lines 102 and 104 to a first PSA zone 200 comprising at least 2 adsorbent beds. During adsorption, the first PSA zone provides an adsorption effluent in line 106 comprising oxygen and less than about 2 mol-% nitrous oxide which is vented to the atmosphere. At the completion of the adsorption step and prior to breakthrough of nitrous oxide, the first adsorbent bed in first PSA zone having completed adsorption is co-purged with a co-purge stream in line 128 which comprises less than about 2 mol-% oxygen. By co-purging the adsorbent bed, it is meant that the co-purge stream is introduced to the adsorbent bed cocurrently, in a direction which is the same direction that the feedstream is passed through the adsorbent bed. The passing of the co-purge stream at effective conditions through the adsorbent bed sweeps the adsorbent of oxygen prior to desorption and recovery of nitrous oxide. This permits the recovery of a high purity nitrous oxide stream as the desorption effluent stream from the first PSA zone withdrawn in line 108. Preferably, the high purity nitrous oxide stream comprises more than about 80 mol-% nitrous oxide. The high purity nitrous oxide stream in line 108 is passed to a chemical reaction zone, or benzene-to-phenol reaction zone 202 wherein the high purity nitrous oxide stream is contacted with an aromatic hydrocarbon stream comprising benzene in line 110 in the presence of a catalyst to produce a phenol product stream in line 114 and a phenol reactor vent stream in line 112. The phenol reactor vent stream comprises nitrogen, nitrous oxide and hydrocarbons such as benzene. The phenol reactor vent stream is passed to a second PSA zone 210 containing a hydrocarbon selective adsorbent to provide a second adsorption effluent stream in line 116 comprising less than 2 mol-% oxygen and a second desorption effluent in line 118 comprising benzene. The second desorption effluent in line 118 may be returned to the benzene-to-phenol reactor 202 (not shown) for further production of phenol and the second adsorption effluent in line 116 is passed to the first PSA zone 200 to provide at least a portion of the oxygen-lean stream in line 128. Alternatively, an outside purge stream in line 130 comprising less than about 1 mol-% oxygen and selected from the group consisting of pure nitrogen, argon, and mixtures thereof may be employed to copurge the adsorbent beds of the first PSA zone 200.

At least a portion of the phenol product stream in line 114 is passed to a conversion zone 204 to convert a portion of the phenol to a KA mixture comprising cyclohexanol (A) and cyclohexanone (K) in line 120. The KA mixture is passed to an adipic acid reaction zone 206 wherein the KA mixture is reacted with a nitric acid stream in line 140 to produce an adipic acid product in line 142, and a nitrous oxide vent stream in line 126. At least a portion, and preferably all of the nitrous oxide vent stream is passed via line 126 to be admixed with the feedstream in line 102 to significantly reduce nitrous oxide emissions from adipic acid plants and to improve the overall production of adipic acid. With the present invention at least 95% of the nitrous oxide from the production of adipic acid may now be recovered and used to produce more adipic acid product, thereby significantly reducing the potential nitrous oxide emission problems resulting from the production of adipic acid by the nitric acid oxidation of cyclohexanol and cyclohexanone.

FIG. 4 illustrates an adsorption cycle diagram for a 5 adsorbent bed PSA cycle that employs the process of the present invention for the production of a high purity nitrous oxide stream wherein a cocurrent depressurization step, or vent step, and a countercurrent purge step are provided. According to FIG. 4, adsorbent bed (1) undergoes an adsorption step which is followed by a vent step. Adsorbent bed (1) is then allowed to equalize pressure in an equalization step with adsorbent bed (4) which has completed a countercurrent purge step. The equalization step is continued until the beds approach an equalization pressure. Approach the equalization pressure means that the beds approach a differential pressure of about 14 kPa (2 psi) to about 70 kPa (10 psi). Adsorbent bed (1) then is further cocurrently depressurized to a desorption pressure in a blowdown step to provide a first nitrous oxide stream and then adsorbent bed (1) is countercurrently purged with an oxygen-lean stream to provide a second nitrous oxide stream. The first and second nitrous oxide streams are combined to provide the high purity nitrous oxide product comprising less than about 2 mol-% oxygen. At the conclusion of the purge step, the pressure of the adsorbent bed (1) is equalized in an equalization step with adsorbent bed (3) and then countercurrently repressurized. The repressurization is accomplished with adsorption effluent from bed (5). The PSA cycle continues for all five adsorbent beds with 1 adsorption step per bed per cycle as indicated while each of the beds undergo the steps of adsorption, vent, equalization, blowdown, countercurrent purge, equalization, and repressurization.

The following examples are provided for illustrative purposes and are not intended to limit the scope of the claims that follow.

EXAMPLES

EXAMPLE I

Figure 5:
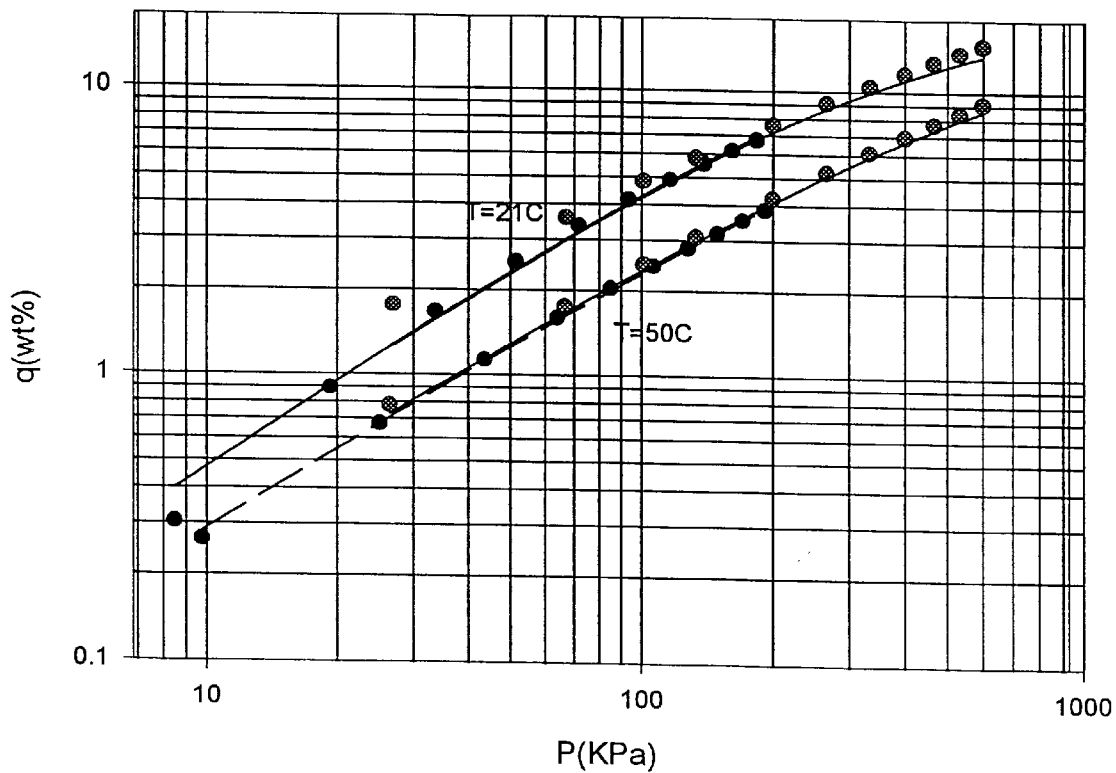
FIG. 5 is a 5-adsorbent bed PSA cycle diagram of the present invention.
Figure 6:
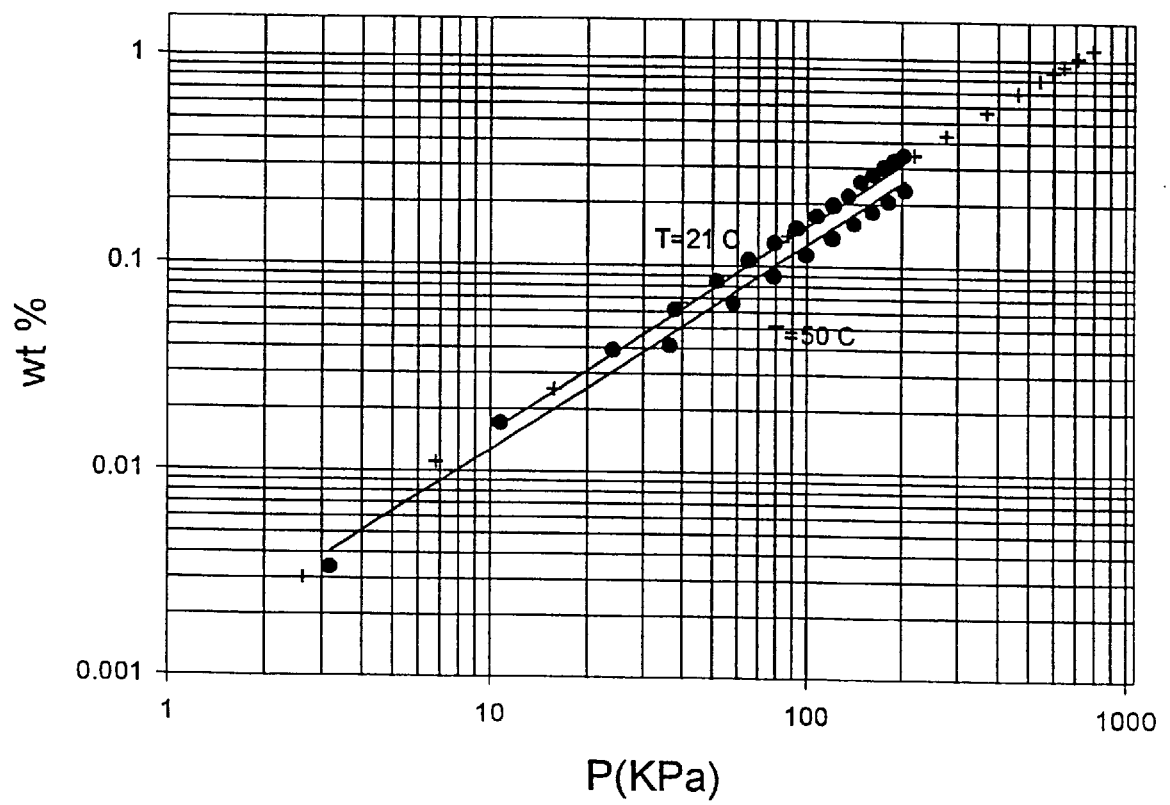
FIG. 6 is a chart showing an oxygen adsorption isotherm on silica gel.
Figure 7:
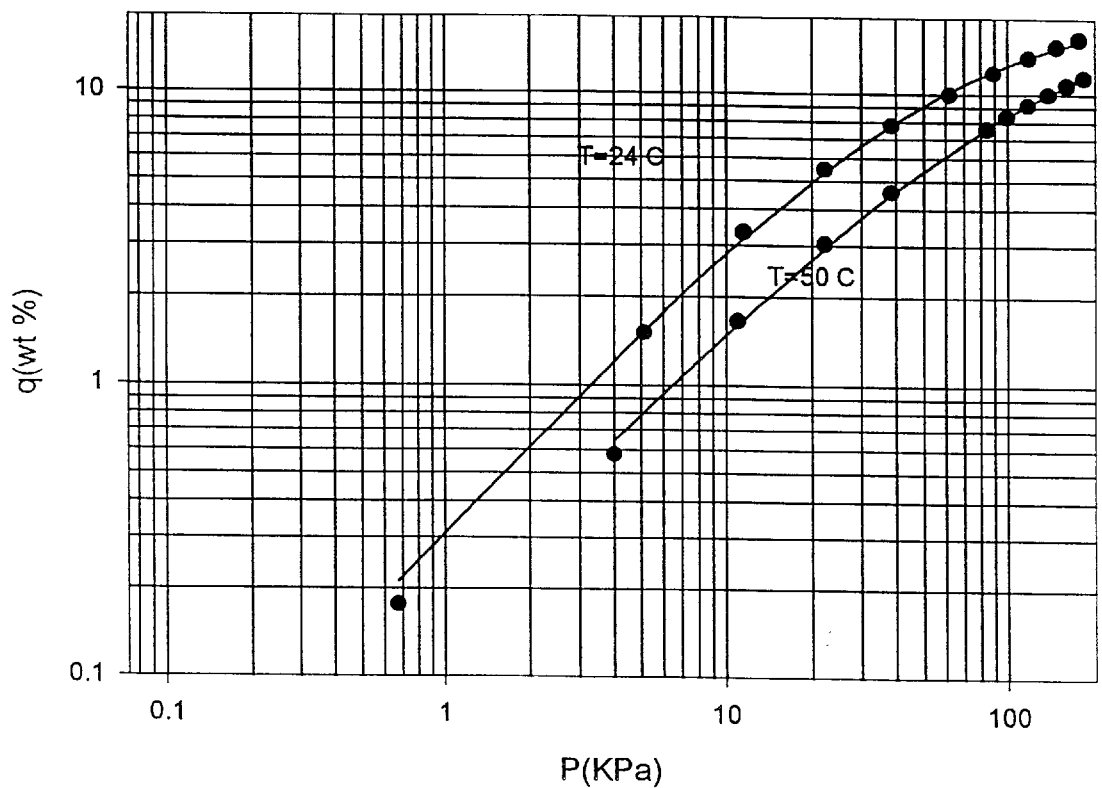
FIG. 7 is a chart showing a nitrous oxide adsorption isotherm on a calcium exchanged Y zeolite adsorbent.
Figure 8:
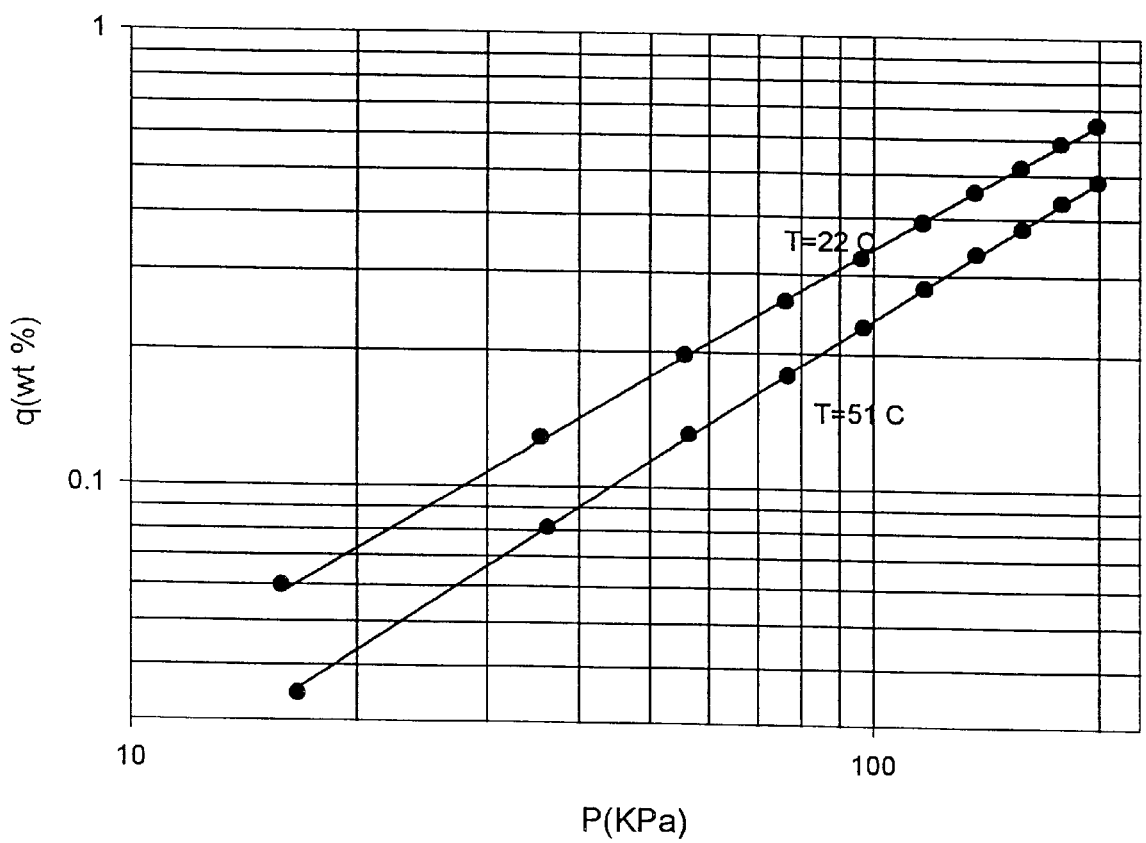
FIG. 8 is a chart showing an oxygen adsorption isotherm on a calcium exchanged Y zeolite adsorbent.

The nitrous oxide adsorption screening tests were conducted in a modified BET adsorption apparatus. The apparatus measures adsorption by sensing changes in pressure and temperature inside a reference volume which is attached to an adsorption vessel containing the adsorbent sample. The adsorbent sample was maintained at a steady temperature by the action of a temperature controlled bath. The reference volume can be isolated from the adsorbent vessel by means of an isolation valve. The reference volume may also be connected or isolated from a gas source by means of another isolation valve, and finally the absolute pressure of the reference volume may be controlled by means of a high vacuum pump which is also connected to the reference volume by means of a third isolation valve. Adsorption measurements were made by first evacuating the reference volume and the adsorbent sample vessel to a pressure of approximately $5\times10^{-6}$ torr while heating the adsorbent and adsorbent vessel to an activation temperature of approximately 200° C. The temperature of activation was controlled and monitored. The activation was considered complete after the pressure of the system was dropped to $5\times10^{-6}$ torr. (generally, about 16 hours). After activation, the sample was isolated from the reference volume and the evacuation pump and was cooled to room temperature. The reference volume also evacuated to $5\times10^{-6}$ torr was also isolated from the vacuum pump and was charged to a vapor pressure of about 5 torr with pure nitrous gas. The pressure of gas was monitored by an MKS Baratron Pressure Transducer. Once stable readings were obtained on both the pressure and temperature within the reference volume, the isolation valve separating the adsorbent sample from the reference volume was opened and the pressure and temperature of the system were monitored until they stabilized, i.e., changing no more than by 1 part in $10^6$ within one minute. Nitrous oxide isotherms were obtained by repeating the isolation, charging and equilibration of the reference volume with the adsorbent vessel until a predetermined loading level or pressure level were obtained. Nitrous oxide loadings on the adsorbent samples were reported in FIG. 5, FIG. 7, and FIG. 9 as a function of the partial pressure of the nitrous oxide gas (kPa) in terms of the weight percent of the nitrous oxide gas loaded on the adsorbent for silica gel, calcium exchanged Y zeolite, and 13X zeolite, respectively. For comparison purposes, oxygen adsorption isotherms were developed in a similar manner and reported in FIG. 6 over silica gel and in FIG. 8 over the calcium exchanged Y zeolite in terms of the weight percent of the oxygen gas loaded on the adsorbent as a function of the partial pressure of the oxygen. The isotherms for the silica gel and calcium exchanged Y zeolite adsorbents were determined at 25° C. and 50° C. The isotherm for the nitrous oxide over the 13X zeolite was determined at about 25° C. A comparison of the nitrous oxide isotherms shown in FIG. 5, is made with the oxygen isotherms shown in FIG. 6, for example at a partial pressure of about 100 kPa, indicated that more of the nitrous oxide would be adsorbed on the silica gel than oxygen at this concentration and that this relative adsorption strength varies linearly between about 10 and about 100 kPa point at both 25° C. and 50° C. Similarly, a comparison of the isotherms over the calcium exchanged Y zeolite showed that the calcium exchanged Y zeolite is a weak adsorbent for oxygen relative to the nitrous oxide, and the isotherms showed an almost linear function of loading as a function of the partial pressure at partial pressures between about 10 and about 100 kPa. In sharp contrast, the isotherm for nitrous oxide over the 13X zeolite, a typical air separation adsorbent, showed almost a constant loading for nitrous oxide partial pressures between about 10 and about 100 kPa.

EXAMPLE II

In Table 1 the relative selectivity, corrected for the molecular weight of the gas component, was determined at 1 atmosphere and about 20° C. In mixtures of nitrous oxide with oxygen, the silica gel and calcium exchanged Y zeolite showed a strong selectivity favoring the adsorption of the nitrous oxide over the adsorption of nitrogen at about 20° C. while at the same temperature indicating a relatively weak tendency for the selectivity of nitrogen relativity to oxygen. This suggests that these adsorbents would not be favored for the separation of air, yet show a surprising selectivity for the separation of nitrous oxide from nitrogen and/or oxygen.

TABLE 1

RELATIVE SELECTIVITY

| Adsorbent | Temp. (C) | Pressure (KPa) | Loading (N2 wt %) | Loading (O2 wt %) | Selectivity (N2/O2) |
|---|---|---|---|---|---|
| Silica Gel | 20 | 100 | 0.15 | 0.14 | 1.22 |
| CaY | 20 | 100 | 0.57 | 0.33 | 1.97 |

| Adsorbent | Temp. (C) | Pressure (KPa) | Loading (N2O wt %) | Loading (N2 wt %) | Selectivity (N2O/N2) |
|---|---|---|---|---|---|
| Silica Gel | 20 | 100 | 4.2 | 0.14 | 34.2 |
| CaY | 20 | 100 | 14 | 0.33 | 48.5 |

EXAMPLE III

The operation of a multi-bed pressure swing adsorption cycle according to the present invention was simulated by modeling the operation of an adsorbent bed containing a nitrous oxide selective adsorbent in each of the separate steps of the cycle, and separately collecting and segregating the effluents from each step to use at the appropriate points later in the cycle. An adipic acid plant waste gas feed stream comprising about 30.5 mol-% nitrous oxide, 57.6 mol-% nitrogen, and 3.9 mol-% oxygen is passed to the adsorbent bed as the feed stream at a pressure of about 700 kPa (about 102 psia) and a temperature of about 25 degrees C., and an adsorption effluent stream is withdrawn. The adsorbent bed is then vented to about 140 kPa (20 psia), and a vent stream is withdrawn. The adsorbent bed then is permitted to reach an equalization pressure by further cocurrently depressurizing the adsorbent bed to an equalization pressure of about 90 kPa (13 psia) and an equalization effluent is withdrawn. The adsorbent bed then is countercurrently depressurized in a blowdown step to a desorption pressure of about 35 kPa (5 psia), and then is countercurrently purged with a pure nitrogen stream. The adsorbent bed then is allowed to undergo an equalization step by reintroducing a portion of the equalization effluent withdrawn previously. The adsorbent bed then is countercurrently repressurized by reintroducing a portion of the adsorption effluent. Table 2 shows the results of the nitrous oxide separation in the operation of this pressure swing adsorption cycle. The compositions are shown as average values and the adsorbent used comprised a mixture of silica gel and calcium Y zeolite in separate layers based on the adsorption isotherms presented in Example 1 for these adsorbents. The overall recovery of nitrous oxide was about 95 mol-% and the oxygen was rejected at a rate of about 98 percent on a molar basis.

TABLE 2

SUMMARY OF NITROUS PSA OPERATION

| Component, Mol-% | Waste Gas | Purge Gas | Adsorption Effluent | $N_2O$ Product |
|---|---|---|---|---|
| Nitrous Oxide | 30.5 | | 2.5 | 66.6 |
| Oxygen | 3.9 | | 6.2 | 0.2 |
| Nitrogen | 57.6 | 100.0 | 90.8 | 15.5 |
| Pressure, kPa | 700 | 35 | 700 | 35 |
| $N_2O$ Recovery | | | | 95% |
| $O_2$ Rejection | | | | 98% |

What is claimed is:

1. A pressure swing adsorption process for the separation of nitrous oxide from a waste stream comprising nitrous oxide, nitrogen, and oxygen, said process comprising the following steps:

a) passing the waste stream at effective conditions including an adsorption pressure and an adsorption temperature to a first adsorbent bed of at least two adsorbent beds in a pressure swing adsorption zone, each of said adsorbent beds containing an adsorbent selective for the adsorption of nitrous oxide relative to nitrogen and oxygen to provide a first adsorption effluent stream comprising oxygen and nitrogen;

b) terminating the passing of said waste stream to the first adsorbent bed prior to the breakthrough of nitrous oxide from said first adsorbent bed;

c) cocurrently depressurizing the first adsorbent bed to a first reduced pressure that is lower than the adsorption pressure and to provide a first vent stream comprising oxygen and nitrogen;

d) further cocurrently depressurizing said first adsorbent bed to an equalization pressure that is lower than the first reduced pressure and passing an equalization effluent to a second adsorbent bed being repressurized;

e) countercurrently depressurizing the first adsorbent bed to a desorption pressure that is lower than the equalization pressure and effective to desorb nitrous oxide and withdrawing a first desorption effluent stream comprising nitrous oxide;

f) countercurrently purging the first adsorbent bed with an oxygen-lean stream to provide a second desorption effluent stream comprising nitrous oxide;

g) combining the first desorption effluent stream and the second desorption effluent stream to provide a nitrous oxide stream and repressurizing the first adsorbent bed to the adsorption pressure and, h) repeating steps (a)–(g) to provide a continuous process.

2. The process of claim 1 wherein repressurizing the first adsorbent bed comprises countercurrently passing a portion of the first adsorption effluent stream from another adsorption bed undergoing step (a) to the first adsorption bed.

3. The process of claim 1 wherein the oxygen lean stream is selected from the group consisting of an external nitrogen stream, a portion of the first vent stream, and a portion of the first adsorbent effluent stream.

4. The process of claim 1 wherein repressurizing the first adsorbent bed comprises passing a repressurization stream to the first adsorbent bed from another adsorbent bed, said repressurization stream being selected from the group consisting of the first vent stream from step (c), the adsorption effluent stream from step (a), and mixtures thereof.

5. The process of claim 1 further comprising cocurrently passing an oxygen-lean stream to the first adsorption bed prior to step (c) and withdrawing a second adsorption effluent stream comprising oxygen and nitrogen.

6. The process of claim 5 wherein the oxygen-lean stream comprises a portion of the nitrous oxide stream or a pure nitrogen stream.

7. The process of claim 6 wherein the pure nitrogen stream comprises about 99 mol-% nitrogen.

8. The process of claim 1 wherein the adsorption pressure ranges from about 170 kPa (25 psia) to about 3.5 MPa (515 psia).

9. The process of claim 1 wherein the first reduced pressure ranges from about 100 kPa (15 psia) to about 350 kPa (50 psia).

10. The process of claim 1 wherein the desorption pressure ranges between about 3 kPa (0.5 psia) and about 210 kPa (30 psia).

11. The process of claim 1 wherein the nitrous oxide in the waste gas stream ranges between 10 and about 75 mol-%.

12. The process of claim 1 wherein the adsorbent selective for the adsorption of nitrous oxide is selected from the group consisting of molecular sieves, activated carbon, and silica gel.

13. The process of claim 12 wherein the molecular sieves comprise faujasite or alkali and alkaline earth exchanged forms of faujasite.

14. The process of claim 13 wherein the alkali and alkaline earth exchanged forms of faujasite include calcium Y zeolite and zinc X zeolite.

15. The process of claim 1 further comprising passing a reactor vent stream comprising nitrous oxide, less than about 2 mol-% oxygen, and aromatic hydrocarbons to a vent pressure swing adsorption zone containing a plurality of vent adsorbent beds, each vent adsorbent bed containing an aromatic hydrocarbon selective adsorbent to provide a crude nitrous oxide stream reduced in aromatic hydrocarbons relative to the reactor vent stream and to provide upon desorption a desorption effluent comprising the aromatic hydrocarbons.

16. The process of claim 15 wherein at least a portion of the crude nitrous oxide stream is passed to the first adsorbent as said oxygen-lean stream.

17. A process for the separation of nitrous oxide from a waste stream comprising nitrous oxide, nitrogen, and oxygen, said process comprising a first PSA zone and a second PSA zone, said first and said second PSA zones containing a plurality of adsorbent beds containing an adsorbent selective for the adsorption of nitrous oxide and said first PSA zone and the second PSA zone, each being operated at effective conditions to adsorb nitrous oxide in the presence of nitrogen and oxygen, said waste stream being passed to said first PSA zone to provide a first effluent stream comprising oxygen and nitrogen at a first elevated pressure and upon desorption withdrawing an intermediate product stream at a first desorption pressure, compressing the intermediate product stream to a second elevated pressure to provide a compressed intermediate product stream, passing the compressed intermediate product stream to a second PSA zone to provide a second effluent stream comprising oxygen and nitrogen and upon desorption provide a high purity nitrous oxide stream comprising at least 90 mol-% nitrous oxide at a second desorption pressure.

18. The process of claim 17 wherein the first elevated pressure and the second elevated pressure range between about 340 kPa (50 psia) to about 3.5 MPa (515 psia) and the first desorption pressure and the second desorption pressure ranges between 3 kPa and about 210 kPa.

19. The process of claim 17 wherein the high purity nitrous oxide stream comprises less than about 2 mol-% oxygen.

20. The process of claim 17 wherein the adsorbent selective for the adsorption of nitrous oxide is selected from the group consisting of silica gel, calcium Y zeolite, zinc X zeolite, and mixtures thereof.

21. A pressure swing adsorption process for the separation of nitrous oxide from a waste stream comprising nitrous oxide, nitrogen, and oxygen, said process comprising the following steps:

a) passing the waste stream at an adsorption pressure to a first adsorbent bed of a first pressure swing adsorption zone comprising a plurality of adsorbent beds, each adsorbent bed containing a nitrous oxide selective adsorbent selected from the group consisting of silica gel, calcium Y zeolite, zinc X zeolite, and mixtures thereof to provide an adsorption effluent comprising oxygen and nitrogen;

b) cocurrently purging the first adsorbent bed at a purge pressure equal to or lower than the adsorption pressure with an oxygen-lean stream to provide an additional adsorption effluent stream;

c) cocurrently depressurizing the first adsorbent bed to a first reduced pressure that is lower than the adsorption pressure and to provide a provide purge stream comprising oxygen and nitrogen;

d) further cocurrently depressurizing said first adsorbent bed to an equalization pressure that is lower than the first reduced pressure and passing an equalization effluent to a second adsorbent bed being repressurized;

e) countercurrently depressurizing the first adsorbent bed to provide a desorption effluent stream comprising high purity nitrous oxide comprising less than about 2 mol-% oxygen;

f) countercurrently purging the first adsorbent bed with an oxygen lean stream to provide an additional high purity nitrous oxide stream;

g) repressurizing the first adsorbent bed with a portion of the adsorption effluent; and h) repeating steps (a)–(g) to provide a continuous process.

22. The process of claim 21 wherein the adsorption pressure ranges from about 170 kPa (25 psia) to about 3.5 MPa (515 psia) and the purge pressure ranges from about 100 kPa (15 psia) to about 350 kPa (50 psia).

23. The process of claim 21 wherein said oxygen-lean stream comprises nitrogen and less than about 2 mol-% oxygen.

24. The process of claim 21 wherein the oxygen-lean stream comprises less than about 0.1 mol-% oxygen.

25. The process of claim 21 further comprising passing the high purity nitrous oxide stream to a chemical reaction zone to partially oxidize and convert an aromatic hydrocarbon feedstream comprising benzene to produce a first product stream comprising phenol and a first reactor vent stream comprising aromatic hydrocarbons and nitrogen.

26. The process of claim 25 further comprising passing the first reactor vent stream to a second pressure swing adsorption zone containing an aromatic hydrocarbon selective adsorbent to provide a second reactor vent stream comprising nitrogen and having an oxygen content less than about 2 mol-% and upon depressurization providing a depressurization effluent comprising aromatic hydrocarbons, returning the depressurization effluent to said chemical reaction zone, and returning at least a portion of the reactor second vent stream to the first pressure swing adsorption zone as said oxygen-lean stream.

27. The process of claim 26 wherein a portion of the second reactor vent stream is withdrawn and passed to an incinerator.

28. The process of claim 27 further comprising passing the first product stream comprising phenol to a second reaction zone to hydrogenate phenol to provide a KA stream comprising cyclohexanone and cyclohexanol, passing the KA stream to a third reaction zone to oxidize the KA stream in the presence of nitric acid to produce an adipic acid product stream and a third vent stream comprising nitrous oxide, and returning at least a portion of the third vent stream to be admixed with the waste stream.

29. The process of claim 21 wherein said adsorbent bed comprises an adsorbent mixture of nitrous oxide selective adsorbent disposed in multiple layers.

30. The process of claim 29 wherein at least about 20 percent of the adsorbent mixture comprises a layer of silica gel adsorbent.

* * * * *